Patented Oct. 24, 1944

2,360,957

UNITED STATES PATENT OFFICE 2,360,957

PROCESS OF MAKING TETRA-ACETALS OF GLYOXAL

Louis G. MacDowell, Charleston, and Raymond W. McNamee, South Charleston, W. Va., assignors to Carbide and Carbon Chemicals Corporation, a corporation of New York No Drawing. Application March 18, 1941, Serial No. 383,929

6 Claims. (Cl. 260—615)

This invention relates to an improved method of making tetra-acetals of glyoxal and it includes certain of these as new compounds.

The tetra-acetals of glyoxal with the lower aliphatic alcohols are known and several processes have been proposed for their preparation. The classic process of Pinner, (Ber. 5, 1872, p. 147) involved heating sodium ethoxide with the diethyl acetal of dichloracetaldehyde to produce glyoxal tetra-ethyl acetal. This process is not adapted for industrial practice. Harries and Temme, (Ber. 40, 1907, p. 165) prepared the same compound in a poor yield by heating trimeric glyoxal with ethyl alcohol in the presence of hydrochloric acid and then permitting the reaction mixture to stand at ordinary temperatures. Recently, Purves, U. S. Patent No. 2,194,405, described the preparation of certain glyoxal tetraacetals by the reaction of glyoxal sulfate with alcohols in the presence of a metal compound capable of forming an insoluble sulphate with the sulfuric acid formed. This process is not commercially feasible because of the large quantities of inorganic acids and salt involved.

According to the present invention, glyoxal tetra-acetals are prepared in economic yields by the direct reaction at elevated temperatures of glyoxal with a lower chloralkanol. The reaction involved may be represented by the following scheme:

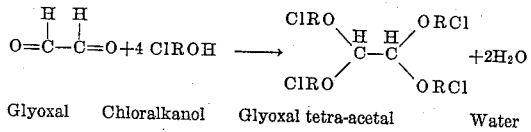

Glyoxal   Chloralkanol   Glyoxal tetra-acetal   Water wherein ClR represent the chloralkyl radical of the chloralkanol.

The essential feature of the present invention influencing the production of the glyoxal tetraacetals in good yields involves the removal of the water of reaction continuously as the reaction progresses. When the chloralkanol employed is itself water-immiscible, this may be effected in some instances by distilling off the constant boiling mixture of water and chloralkanol which forms, condensing this mixture and returning the chloralkanol layer to the reaction vessel. Carrying out the process under reduced pressure will also facilitate removal of the water, especially when the acetal formed is that of a higher-boiling chloralkanol. Irrespective of the solubility in water of the chloralkanol involved, the process may be carried out advantageously in the presence of a volatile, inert, water-immiscible liquid, such as benzene, toluene, xylene, hexane, ethylene dichloride, or isopropyl ether, and the water of reaction can be removed as an azeotropic distillate with this liquid. This procedure has the advantage of permitting the use of lower reaction temperatures, thus retarding the formation of by-products. Regardless of the manner in which the water is removed, it is preferable to carry out the process in the presence of a stoichiometric excess of the chloralkanol. The temperature at which the process is conducted may vary from but slightly above atmospheric up to temperatures near the boiling point of the acetal products formed. The process is facilitated by the presence of small amounts of an acidic catalyst, including mineral acids, such as hydrochloric and sulfuric acids, as well as acid salts, such as aluminum sulfate and boron trifluoride.

The glyoxal is conveniently added in the form of an aqueous solution where it may exist in the form of a hydrate or a hydrated polymer, possibly tetrahydroxydioxane. Thus, the forms of glyoxal reactive with lower chloralkanols to yield glyoxal tetra-acetals comprise aqueous solutions of glyoxal, as well as monomeric glyoxal, its hydrates, polymers, and hydrated polymers. Where the glyoxal is initially associated with water, the invention contemplates that this water will be removed along with the water formed in the reaction. Even when large amounts of water are initially present, which may occur where an impure product containing a hydrated polymer is employed, yields of the tetra-acetal as great as 80% to 90% may be obtained by the method of this invention.

The following example will serve to illustrate the invention:

Two hundred and fifteen (215) grams of an 81% aqueous solution of glyoxal, 1930 grams of ethylene chlorhydrin, 250 cc. of benzene and 0.5 cc. of concentrated sulfuric acid were heated together in a distilling vessel. A constant boiling mixture of water and benzene was distilled over, condensed, and collected in a decanter from which the water layer was removed and the benzene layer returned to the still column as reflux. After 144 grams of water had been removed, two grams of potassium acetate were added to the reaction mixture and the excess of benzene was distilled off. A 45% yield of the tetra-($\beta$-chlorethyl) acetal of glyoxal was obtained. This material is representative of a new class of chlorine-containing ethers and it boils at 187° to 188° C. at 4 to 5 mm., and has a specific gravity of 1.332 at 20° C. This chlorine-containing glyoxal acetal possesses merit as an addition agent for extreme pressure lubricants and it is useful in making rubber-like products by condensation with polysulfide compounds. In addition, its plurality of chlorine atoms makes it a valuable intermediate for the synthesis of many compounds of unusual structure and properties. The chlorinated glyoxal tetra-acetals derived from other lower chloralkanols, such as propylene chlorhydrin and chlorbutanol, have similar properties and they may be prepared in like manner.

Modifications of the invention other than those disclosed will be readily apparent to those skilled in the art and are included within the invention as defined by the appended claims.

Subject matter once shown and claimed in this application is now described and claimed in our divisional application Serial No. 478,638, filed March 10, 1943.

We claim:

1. Process for making glyoxal lower tetra-chloralkyl acetals which comprises heating an aqueous solution of glyoxal with a lower chloralkanol in the presence of a small amount of an acidic catalyst, progressively distilling water from the reaction mixture, and recovering a glyoxal lower tetra-chloroalkyl acetal from the reaction mixture.

2. As new compounds, glyoxal tetra-chloralkyl acetals of chloralkanols having less than six carbon atoms.

3. As a new compound, glyoxal tetra(beta-chlorethyl) acetal.

4. Process for making glyoxal lower tetra-chloralkyl acetals which comprises heating glyoxal with a lower chloralkanol, progressively distilling water from the reaction mixture, and recovering a glyoxal lower tetra-chloralkyl acetal from the reaction mixture.

5. Process for making glyoxal lower tetra-chloroalkyl acetals which comprises heating an aqueous solution of glyoxal with at least four mols of a lower chloralkanol per mol of glyoxal in the presence of an inert, volatile, water-immiscible liquid and a small amount of an acidic catalyst, distilling a mixed distillate of water and said liquid from the reaction mixture, and recovering a glyoxal lower tetra-chloralkyl acetal from the reaction mixture.

6. Process for making glyoxal lower tetra-chloralkyl acetals which comprises heating aqueous glyoxal with a lower chloralkanol, progressively distilling water from the reaction mixture, and recovering a glyoxal lower tetra-chloralkyl acetal from the reaction mixture.

LOUIS G. MacDOWELL.
RAYMOND W. McNAMEE.